US012505521B2

(12) United States Patent
Phillips et al.

(10) Patent No.: US 12,505,521 B2
(45) Date of Patent: Dec. 23, 2025

(54) SYSTEMS AND METHODS FOR LiDAR ATMOSPHERIC FILTERING BACKGROUND

(71) Applicant: Kodiak Robotics, Inc., Mountain View, CA (US)

(72) Inventors: Derek J. Phillips, Mountain View, CA (US); David Peng, Wilmette, IL (US)

(73) Assignee: Kodiak Robotics, Inc., Mountain View, CA (US)

( * ) Notice: Subject to any disclaimer, the term of this patent is extended or adjusted under 35 U.S.C. 154(b) by 613 days.

(21) Appl. No.: 17/806,804

(22) Filed: Jun. 14, 2022

(65) Prior Publication Data

US 2023/0401680 A1 Dec. 14, 2023

(51) Int. Cl.
*G06T 5/80* (2024.01)
*G06T 7/73* (2017.01)

(52) U.S. Cl.
CPC ............ *G06T 5/80* (2024.01); *G06T 7/75* (2017.01); *G06T 2207/10028* (2013.01); *G06T 2207/20024* (2013.01)

(58) Field of Classification Search
CPC ... G06T 5/80; G06T 7/75; G06T 2207/10028; G06T 2207/20024; G01S 7/4808; G01S 7/4876; G01S 13/865; G01S 17/42; G01S 17/86; G01S 17/931
See application file for complete search history.

(56) References Cited

U.S. PATENT DOCUMENTS

| 2016/0154999 | A1* | 6/2016 | Fan ................... G06T 7/155 382/103 |
| 2017/0023473 | A1 | 1/2017 | Wegner et al. |
| 2018/0074203 | A1* | 3/2018 | Zermas ............... G06N 20/00 |
| 2018/0284226 | A1* | 10/2018 | LaChapelle ........... G01S 17/10 |

(Continued)

FOREIGN PATENT DOCUMENTS

CN 114494075 A 5/2022

OTHER PUBLICATIONS

Park, Ji-Il et al., "Fast and Accurate Desnowing Algorithm for LiDAR Point Clouds", IEEE Access, IEEE, USA, vol. 8, Aug. 28, 2020, pp. 160202-160212.

(Continued)

*Primary Examiner* — Tom Y Lu
(74) *Attorney, Agent, or Firm* — Fox Rothschild LLP

(57) ABSTRACT

Systems and methods are provided for filtering atmospheric conditions from LiDAR point clouds. The method includes generating, using a LiDAR system, at least one point cloud, wherein the LiDAR system includes a processor. The method further includes, using the processor, identifying and isolating one or more ground points within a point cloud of the at least one point cloud, wherein the one or more ground points indicate a ground portion within an environment of the point cloud, filtering out the ground portion from the point cloud, generating an initial processed point cloud, identifying and isolating one or more atmospheric condition points within the initial processed point cloud, wherein the (Continued)

one or more atmospheric condition points indicate one or more atmospheric conditions within an environment of the processed point cloud, and filtering out the atmospheric condition points from the initial processed point cloud, generating a final processed point cloud.

17 Claims, 6 Drawing Sheets

(56) References Cited

U.S. PATENT DOCUMENTS

| | | | | |
|---|---|---|---|---|
| 2019/0147245 A1* | 5/2019 | Qi | ............................ | G06V 10/82 |
| | | | | 382/103 |
| 2019/0163968 A1* | 5/2019 | Hua | ......................... | G06V 20/58 |
| 2019/0384303 A1* | 12/2019 | Muller | .................... | G08G 1/166 |
| 2020/0200912 A1* | 6/2020 | Chen | ...................... | G06V 20/582 |
| 2021/0048515 A1* | 2/2021 | Zhou | ........................ | G01S 7/487 |
| 2021/0255637 A1* | 8/2021 | Kale | ......................... | G06N 3/049 |
| 2021/0302582 A1* | 9/2021 | Liu | ........................... | G01S 17/93 |
| 2022/0137219 A1* | 5/2022 | Charan | ................. | G01S 17/931 |
| | | | | 701/514 |

OTHER PUBLICATIONS

International Search Report from PCT/US23/68069 dated Nov. 13, 2023.

* cited by examiner

SYSTEMS AND METHODS FOR LiDAR ATMOSPHERIC FILTERING BACKGROUND

BACKGROUND

Field of the Disclosure

Embodiments of the present disclosure relate to Light Detection and Ranging (LiDAR) object detection and, in particular, to systems and methods for filtering atmospheric conditions from LiDAR point clouds.

Description of the Related Art

Self-driving or otherwise autonomous vehicles require the ability to be able to detect one or more objects and/or potential hazards within the environment of the vehicle in order to safely and efficiently navigate the environment and prevent possible collision. In order to detect these objects and potential hazards, autonomous vehicles are often equipped with one or more types of environmental sensing technologies, such as, e.g., photographic imaging systems and technologies (e.g., cameras), radio detection and ranging (RADAR) systems and technologies, and Light Detection and Ranging (LiDAR) systems and technologies.

A LiDAR sensor is configured to emit light, which strikes material (e.g., objects) within the vicinity of the LiDAR sensor. Once the light comes into contact with the material, the light is deflected. Some of the deflected light bounces back to the LiDAR sensor. The LiDAR sensor is configured to measure data pertaining to the light bounced back (e.g., the distance traveled by the light, the length of time it took for the light to travel from and to the LiDAR sensors, the intensity of the light returning to the LiDAR sensor, etc.). This data can then be used to generate a point cloud of some or all of the environment around the LiDAR sensor, generally recreating an object map of the objects within the environment.

When used on a vehicle, the LiDAR sensor can be used to detect one or more objects within the environment of the vehicle. Due to LiDAR's use of data points gathered using light that has bounced off of one or more objects, LiDAR's reliability, particularly pertaining to its use with autonomous vehicles, can be affected by various atmospheric conditions such as, e.g., rain and fog, because these conditions can absorb and reflect light, resulting in false readings pertaining to the presence and/or size of objects within the environment of the vehicle. Due to at least this shortfall, LiDAR is often used in conjunction with other technologies, such as photographic imaging systems and technologies and RADAR systems and technologies.

Existing technologies attempt to adjust for this LiDAR limitation through a density-based approach, whereby a LiDAR point cloud is analyzed in order to determine a point density for each point in the point cloud. Points having a low density (i.e., points having a distance from other points greater than a threshold distance) are filtered from the LiDAR point cloud, while points having a high density (i.e., points have a distance from other points less than a threshold distance) are maintained within the point cloud. One area of issue with this method is that some atmospheric conditions, such as rain clouds, can result in points in a LiDAR point cloud having high densities, resulting in false objects being predicted by LiDAR systems.

Other existing technologies analyze an intensity of each of the points in the point cloud in conjunction with density analysis over the entirety of the point cloud. However, objects, such as vehicles, can produce points in a LiDAR point cloud of both high-intensity and low-intensity. This method, then, also leads to inappropriate object identification, or lack thereof, within the environment of the point cloud.

Another issue with the systems and methods of the existing technologies is the handling of the ground within a LiDAR point cloud. In the existing technologies, the ground is not identified, isolated, and filtered out of the LiDAR point cloud, increasing the difficulty of identifying objects and/or atmospheric conditions along the relative border of the ground portion.

Therefore, for at least these reasons, systems and methods for more accurately differentiating between atmospheric conditions and objects within LiDAR point clouds is needed.

SUMMARY

According to an embodiment of the present disclosure, a method of filtering atmospheric conditions from Light Detection and Ranging (LiDAR) point clouds is provided. The method may include generating, using a LiDAR system, at least one point cloud, wherein the LiDAR system includes a processor. The method may further include, using the processor, identifying and isolating one or more ground points within a point cloud of the at least one point cloud, wherein the one or more ground points indicate a ground portion within an environment of the point cloud, filtering out the ground portion from the point cloud, generating an initial processed point cloud, identifying and isolating one or more atmospheric condition points within the initial processed point cloud, wherein the one or more atmospheric condition points indicate one or more atmospheric conditions within an environment of the processed point cloud, and filtering out the atmospheric condition points from the initial processed point cloud, generating a final processed point cloud.

According to an embodiment of the present disclosure, the identifying and isolating the one or more atmospheric condition points may comprise identifying one or more high-intensity points and one or more low-intensity points, and a position for each of the one or more high-intensity point and each of the one or more low-intensity points, within the initial processed point cloud, for each of the one or more low-intensity points, determining a mean distance of the low-intensity point to one or more of the one or more high-intensity points, and for each of the one or more low-intensity points, when the mean distance is greater than a threshold distance, classifying the low-intensity point as an atmospheric condition point.

According to an embodiment of the present disclosure, the identifying the one or more high-intensity points and the one or more low-intensity points within the initial processed point cloud may comprise determining an intensity score for each point in the initial processed point cloud, classifying each point in the initial processed point cloud having an intensity score above an intensity threshold as a high-intensity point, and classifying each point in the initial processed point cloud having an intensity score below the intensity threshold a low-intensity point.

According to an embodiment of the present disclosure, the method may further comprise classifying all points not filtered out in the final processed point cloud as obstacle points, wherein the obstacle points indicate one or more objects within the environment of the final processed point cloud.

According to an embodiment of the present disclosure, the one or more atmospheric conditions may include one or more of rain and fog.

According to an embodiment of the present disclosure, the at least one point cloud may include an initial point cloud and a subsequent point cloud, and the identifying and isolating the one or more ground points comprises identifying and isolating one or more ground points within the initial point cloud, an identifying and isolating one or more ground points within the subsequent point cloud by comparing the one or more ground points within the initial point cloud against one or more points within the subsequent point cloud.

According to an embodiment of the present disclosure, the identifying and isolating the one or more ground points may comprise comparing the point cloud against one or more secondary scans of the environment of the point cloud.

According to an embodiment of the present disclosure, the one or more secondary scans may include one or more of one or more two-dimensional (2D) camera images of the environment, and one or more radio detection and ranging (RADAR) scans of the environment.

According to another embodiment of the present disclosure, a system for filtering atmospheric conditions from LiDAR point clouds is provided. The system may include a vehicle, and a LiDAR system, coupled to the vehicle. The LiDAR system may include one or more LiDAR sensors, and a processor. The processor may be configured to generate at least one point cloud of an environment, identify and isolate one or more ground points within a point cloud of the at least one point cloud, wherein the one or more ground points indicate a ground portion within an environment of the point cloud, filter out the ground portion from the point cloud, generating an initial processed point cloud, identify and isolate one or more atmospheric condition points within the initial processed point cloud, wherein the one or more atmospheric condition points indicate one or more atmospheric conditions within an environment of the processed point cloud, and filter out the atmospheric condition points from the initial processed point cloud, generating a final processed point cloud.

According to an embodiment of the present disclosure, the identifying and isolating the one or more atmospheric condition points may comprise identifying one or more high-intensity points and one or more low-intensity points, and a position for each of the one or more high-intensity point and each of the one or more low-intensity points, within the initial processed point cloud, for each of the one or more low-intensity points, determining a mean distance of the low-intensity point to one or more of the one or more high-intensity points, and for each of the one or more low-intensity points, when the mean distance is greater than a threshold distance, classifying the low-intensity point as an atmospheric condition point.

According to an embodiment of the present disclosure, the identifying the one or more high-intensity points and the one or more low-intensity points within the initial processed point cloud may comprise determining an intensity score for each point in the initial processed point cloud, classifying each point in the initial processed point cloud having an intensity score above an intensity threshold as a high-intensity point, and classifying each point in the initial processed point cloud having an intensity score below the intensity threshold a low-intensity point.

According to an embodiment of the present disclosure, the processor may be further configured to classify all points not filtered out in the final processed point cloud as obstacle points, wherein the obstacle points indicate one or more objects within the environment of the final processed point cloud.

According to an embodiment of the present disclosure, the at least one point cloud may include an initial point cloud and a subsequent point cloud, and the identifying and isolating the one or more ground points may comprise identifying and isolating one or more ground points within the initial point cloud, and identifying and isolating one or more ground points within the subsequent point cloud by comparing the one or more ground points within the initial point cloud against one or more points within the subsequent point cloud.

According to an embodiment of the present disclosure, the system may further include one or more secondary scanners configured to scan the environment of the point cloud, and generate one or more secondary scans of the environment of the point cloud, wherein the identifying and isolating the one or more ground points may comprise comparing the point cloud against the one or more secondary scans of the environment of the point cloud.

According to an embodiment of the present disclosure, the one or more secondary scanners may include one or more of: one or more cameras; and one or more RADAR scanners.

According to yet another embodiment of the present disclosure, a system is provided. The system may include at least one LiDAR system, coupled to a vehicle, configured to generate one or more point clouds of an environment, and a computing device, including a processor and a memory, coupled to the vehicle, configured to store programming instructions. When executed by the processor, the programming instructions may be configured to cause the processor to identify and isolate one or more ground points within a point cloud of the at least one point cloud, wherein the one or more ground points indicate a ground portion within an environment of the point cloud, filter out the ground portion from the point cloud, generating an initial processed point cloud, identify and isolate one or more atmospheric condition points within the initial processed point cloud, wherein the one or more atmospheric condition points indicate one or more atmospheric conditions within an environment of the processed point cloud, and filter out the atmospheric condition points from the initial processed point cloud, generating a final processed point cloud.

According to an embodiment of the present disclosure, when the processor may identify and isolate the one or more atmospheric condition points, the programming instructions may be further configured to cause the processor to identify one or more high-intensity points and one or more low-intensity points, and a position for each of the one or more high-intensity point and each of the one or more low-intensity points, within the initial processed point cloud, for each of the one or more low-intensity points, determine a mean distance of the low-intensity point to one or more of the one or more high-intensity points, and, for each of the one or more low-intensity points, when the mean distance is greater than a threshold distance, classify the low-intensity point as an atmospheric condition point.

According to an embodiment of the present disclosure, when the processor identifies the one or more high-intensity points and the one or more low-intensity points within the initial processed point cloud, the programming instructions may be further configured to cause the processor to determine an intensity score for each point in the initial processed point cloud, classify each point in the initial processed point cloud having an intensity score above an intensity threshold as a high-intensity point, and classify each point in the initial processed point cloud having an intensity score below the intensity threshold a low-intensity point.

According to an embodiment of the present disclosure, the programming instructions may be further configured to cause the processor to classify all points not filtered out in the final processed point cloud as obstacle points, wherein the obstacle points indicate one or more objects within the environment of the final processed point cloud.

According to an embodiment of the present disclosure, the at least one point cloud may include an initial point cloud and a subsequent point cloud, and, when the processor identifies and isolates the one or more ground points, the programming instructions may be further configured to cause the processor to identify and isolate one or more ground points within the initial point cloud, and identify and isolate one or more ground points within the subsequent point cloud by comparing the one or more ground points within the initial point cloud against one or more points within the subsequent point cloud.

DETAILED DESCRIPTION

Figure 1:
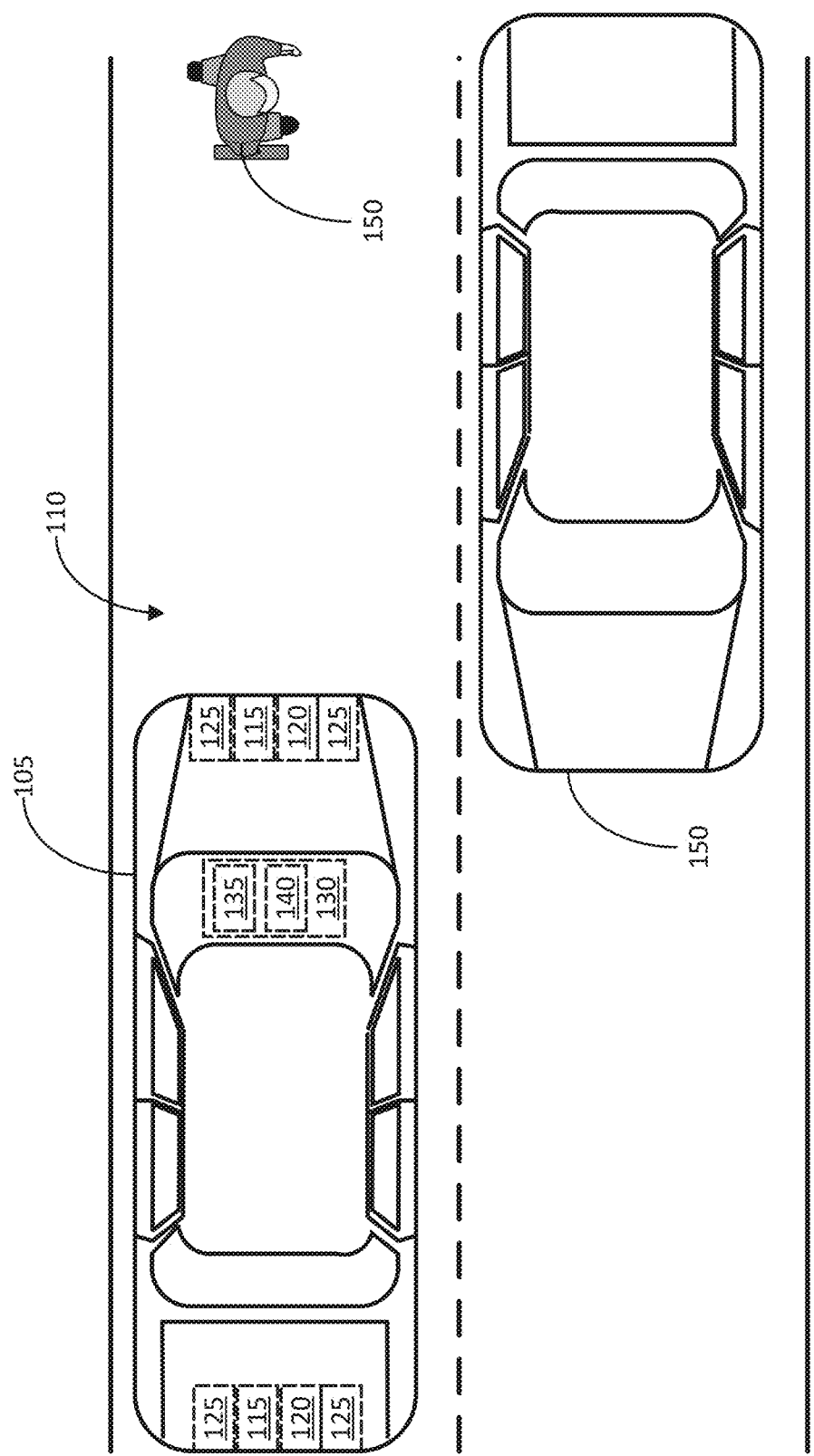
FIG. 1 illustrates an example Light Detection and Ranging (LiDAR)-equipped vehicle on a roadway, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory bill contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for filtering atmospheric conditions from Light Detection and Ranging (LiDAR) point clouds, according to embodiments of the present disclosure, will be described with reference to the accompanying drawings.

Referring now to FIG. 1, a LiDAR-equipped vehicle 105 on a roadway 110 is illustratively depicted, in accordance with various embodiments of the present disclosure.

According to various embodiments, the vehicle 105 one or more sensors such as, for example, one or more LiDAR sensors 115, one or more radio detection and ranging (RADAR) sensors 120, and one or more cameras 125, among other suitable sensors. According to various embodiments, the one or more sensors may be in electronic communication with one or more computing devices 130. The computing devices 130 may be separate from the one or more sensors and/or may be incorporated into the one or more sensors. The vehicle 105 may include a LiDAR system which includes one or more LiDAR sensors 115 and one or more computing devices 130.

In the example of FIG. 1, the LiDAR sensor 115 is configured to emit light, which strikes material (e.g., obstacles 150) within the environment of the vehicle 105. Once the light comes into contact with the material, the light is deflected. Some of the deflected light bounces back to the LiDAR sensor 115. The LiDAR sensor 115 may be configured to measure data pertaining to the light bounced back (for example, the distance traveled by the light, the length of time it took for the light to travel from and to the LiDAR sensor 115, the intensity of the light returning to the LiDAR sensor 115, and so on as understood by a person of ordinary skill). This data may then be used to generate a point cloud of some or all of the environment around the vehicle 105, generally recreating an object map of the obstacles 150 within the environment.

According to various embodiments, the LiDAR sensor 115 may be coupled to the vehicle 105 and may be configured to generate one or more point clouds of an environment surrounding the vehicle 105. The environment may fully surround the vehicle or may encompass a portion of the vehicle's 105 surroundings.

According to various embodiments, the computing device 130 may include a processor 135 and/or a memory 140. The memory 140 may be configured to store programming instructions that, when executed by the processor 135, are configured to cause the processor 135 to perform one or more tasks such as, e.g., generating the one or more point clouds, identifying and isolating one or more ground points within a point cloud, filtering filter out the ground portion from the point cloud, generating an initial processed point cloud, identifying and isolating one or more atmospheric condition points within the initial processed point cloud, and filtering out the atmospheric condition points from the initial processed point cloud, generating a final processed point cloud. According to various embodiments, the one or more ground points indicate a ground portion within an environment of the point cloud, and the one or more atmospheric condition points indicate one or more atmospheric conditions within an environment of the processed point cloud. The atmospheric conditions may include, e.g., rain, fog, smoke, smog, snow, dust, and/or other suitable forms of atmospheric conditions.

According to various embodiments, identifying and isolating the one or more atmospheric condition points may include identifying one or more high-intensity points and one or more low-intensity points, and a position for each of the one or more high-intensity point and each of the one or more low-intensity points, within the initial processed point cloud. An intensity score may be determined for each point in the initial processed point cloud. According to various embodiments, each of these intensity scores may be compared against an intensity threshold. The intensity threshold may be dynamic and/or predetermined.

According to various embodiments, each point in the initial processed point cloud having an intensity score above an intensity threshold may be classified as a high-intensity point, and each point in the initial processed point cloud having an intensity score below the intensity threshold may be classified as a low-intensity point. Thus, a point cloud may have low-intensity points, high-intensity points, and/or a mixture of high-intensity points and low-intensity points.

According to various embodiments, the processor 135 may be configured, for each of the one or more low-intensity points, to calculate a mean distance, within the point cloud, of the low-intensity point to one or more of the one or more high-intensity points. For each of the one or more low-intensity points, when the mean distance is greater than a threshold distance, the low-intensity point may be classified as an atmospheric condition point. The distance threshold may be dynamic and/or predetermined.

Figure 2:
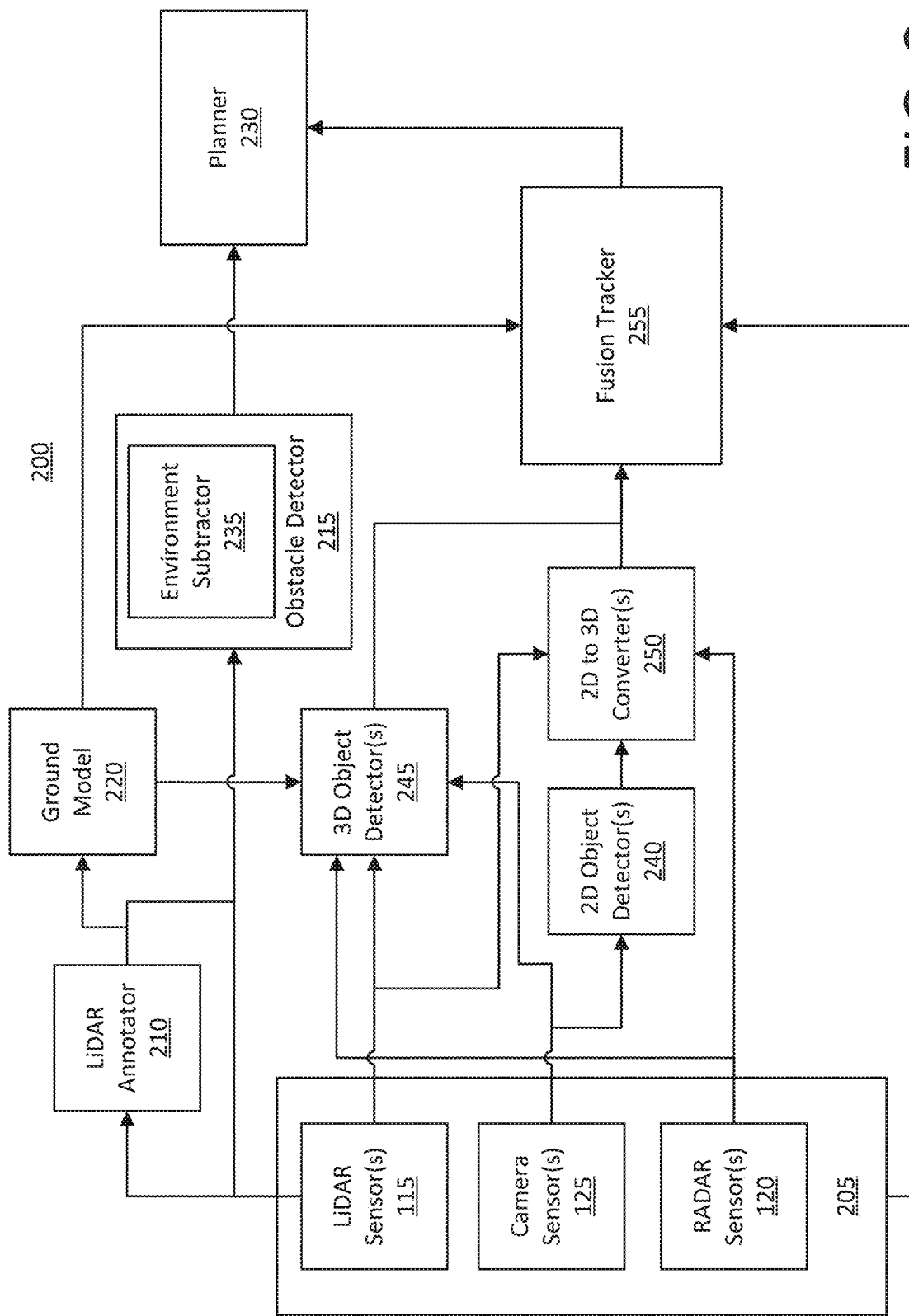
FIG. 2 is an example block diagram of a perception system of a vehicle, according to various embodiments of the present disclosure.

The vehicle 105 may include a perception system 200, such as shown, for example, in FIG. 2. The perception system 200 may be configured to aid the vehicle 105 in identifying/perceiving one or more obstacles 150 within the environment of the vehicle 105.

According to various embodiments, the perception system 200 may include one or more sensors 205 including, for example, LiDAR sensors 115, RADAR sensors 120, cameras 125, etc. The one or more sensors 205 may be positioned at any suitable position or positions along a vehicle 105 (e.g., the front, sides, back, top, bottom, etc.).

According to various embodiments, the LiDAR sensor(s) 115 may be in electronic communication with one or more LiDAR annotation modules 210. A LiDAR annotation module 210 may be configured to annotate one or more point clouds for use in obstacle detection (using, for example, obstacle detection module 215) in the path, potential path, and/or environment of the vehicle 105.

According to various embodiments, the LiDAR annotators 210 may work in conjunction with a ground model 220 configured to model a ground portion of the one or more LiDAR point clouds. Ground portions of LiDAR point clouds are generally high-intensity, high-density points in the point cloud. To more accurately detect atmospheric points in the point cloud along, or near, the ground portion, the systems and methods of the present disclosure may be configured to filter out the ground portion prior to applying three-dimensional (3D) object detection 225 analysis upon the point cloud.

According to various embodiments, the LiDAR sensor(s) 115 and/or the LiDAR annotation module 210 may provide data that can be analyzed by an obstacle detector module 215 to detect one or more obstacles in the path, potential path, and/or environment of the vehicle 105. These obstacles (e.g., obstacles 150 as shown in FIG. 1) may then be sent to a planning module 230 for planning a trajectory of the vehicle 105. According to various embodiments, the obstacle detector 215 may include an environment subtractor module 235 configured to subtract areas of the environment from the obstacle detector 215 in which environmental conditions (e.g., rain, fog, and/or other weather conditions) would otherwise be identified as obstacles 150.

According to various embodiments, when identifying and/or isolating the one or more ground points, the perception system 200 may be configured to compare the LiDAR point cloud against one or more secondary scans of the environment, such as, for example, one or more two-dimensional (2D) camera images of the environment, RADAR scans of the environment, and/or other suitable maps incorporating surface features of the road, and/or other suitable methods of determining a road surface, as understood by a person of ordinary skill. Alternatively, the LiDAR point cloud itself may be analyzed to determine the road surface. According to various embodiments, one or more of the LiDAR sensor(s) 115, the RADAR sensor(s) 120, and the camera sensor(s) 125 can supply data for analysis by a 2D object detection module 240 (for detecting objects in a 2D space) and/or a 3D object detection module 245 (for detecting objects in a 3D space). The 3D object detection module 245 may further be used for determining the ground points within the point cloud. Additionally, 2D imagery may further be converted to 3D for 3D analysis, using a 2D to 3D converting module 250.

According to various embodiments, the data from the one or more sensors 205 and/or the data from the object detection modules 240, 245 may be sent to a fusion tracker module 255 configured to fuse data from multiple sensors and/or sensor types while keeping track of objects, obstacles, and/or ground data from one cycle of analysis to another cycle of analysis. According to various embodiments, the fusion tracker module 255 may be configured to analyze previous sensor data analyses against new sensor data in order to maintain and/or modify object and/or obstacle data in order to improve obstacle determination accuracy. The results of the fusion tracker module 255 may be sent to the planning module 230 for use in planning trajectories of the vehicle 105.

Figure 3:
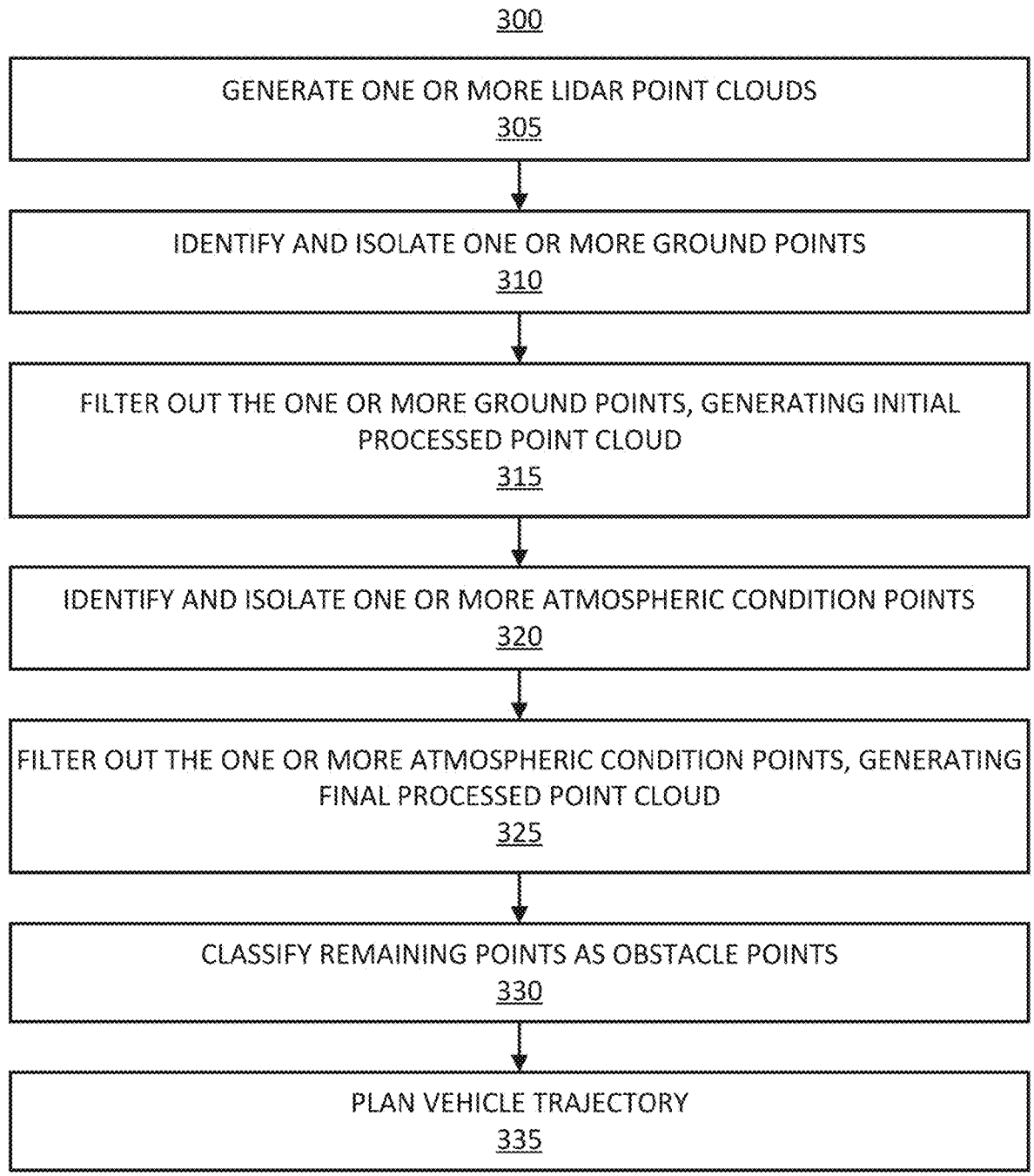
FIG. 3 is an example flowchart of a method for identifying, isolating, and filtering ground points and atmospheric condition points in a LiDAR point cloud, according to various embodiments of the present disclosure.

Referring now to FIG. 3, an example flowchart of a method 300 for identifying, isolating, and filtering ground points and atmospheric condition points in a LiDAR point cloud is described, in accordance with various embodiments of the present disclosure.

At 305, one or more LiDAR point clouds are generated, using a LiDAR system including one or more LiDAR sensors and at least one computer memory and computer processor. According to various embodiments, a LiDAR point cloud in the one or more LiDAR point clouds is an initial LiDAR point cloud, representative of all or part of a vehicle's surrounding environment. The LiDAR point cloud may, e.g., be from a combination of different types of LiDAR sensors. For example, scanning LiDAR sensors, spinning LiDAR sensors, flash LiDAR sensors, and/or other suitable types of LiDAR sensor may be combines in the LiDAR point cloud.

At 310, one or more ground points within the initial point cloud are identified and isolated. The one or more ground points are identified using any suitable means such as, e.g., analysis of the initial LiDAR point cloud against other sensor data (e.g., camera data, RADAR data, etc.), analysis of the LiDAR point cloud against analysis of one or more prior LiDAR point cloud analyses, analysis of points in the initial LiDAR point cloud for point intensity and/or point density (based on thresholds for determining intensity and/or density of known ground points), and/or other suitable means. According to various embodiments, the one or more ground points may indicate a ground portion within an environment of the point cloud.

According to various embodiments, the at least one point cloud includes an initial point cloud and a subsequent point cloud, and the identifying and isolating the one or more ground points identifying and isolating one or more ground points within the initial point cloud, and identifying and isolating one or more ground points within the subsequent point cloud by comparing the one or more ground points within the initial point cloud against one or more points within the subsequent point cloud.

At 315, the one or more ground points are filtered out from initial LiDAR point cloud, generating an initial processed point cloud.

At 320, the initial processed point cloud is analyzed, identifying and isolating one or more atmospheric condition points within the initial processed point cloud. According to various embodiments, the initial processed point cloud may be a collection of non-ground points that have returns from the LiDAR scan. The one or more atmospheric condition points indicate one or more atmospheric conditions within an environment of the processed point cloud. The atmospheric conditions may include, e.g., rain, fog, smoke, smog, snow, dust, and/or other suitable forms of atmospheric conditions. At 325, the one or more atmospheric condition points are filtered out from the initial processed point cloud, generating a final processed point cloud, wherein the remaining points in the final processed point cloud are, at 330, classified as obstacle points indicating one or more obstacles. Steps 320, 325 are shown and described in more detail in FIG. 4.

At 335, a trajectory of the vehicle is planned, incorporating the final processed point cloud and obstacle data into the trajectory in order to enable the vehicle to avoid the one or more classified obstacles.

Figure 4:
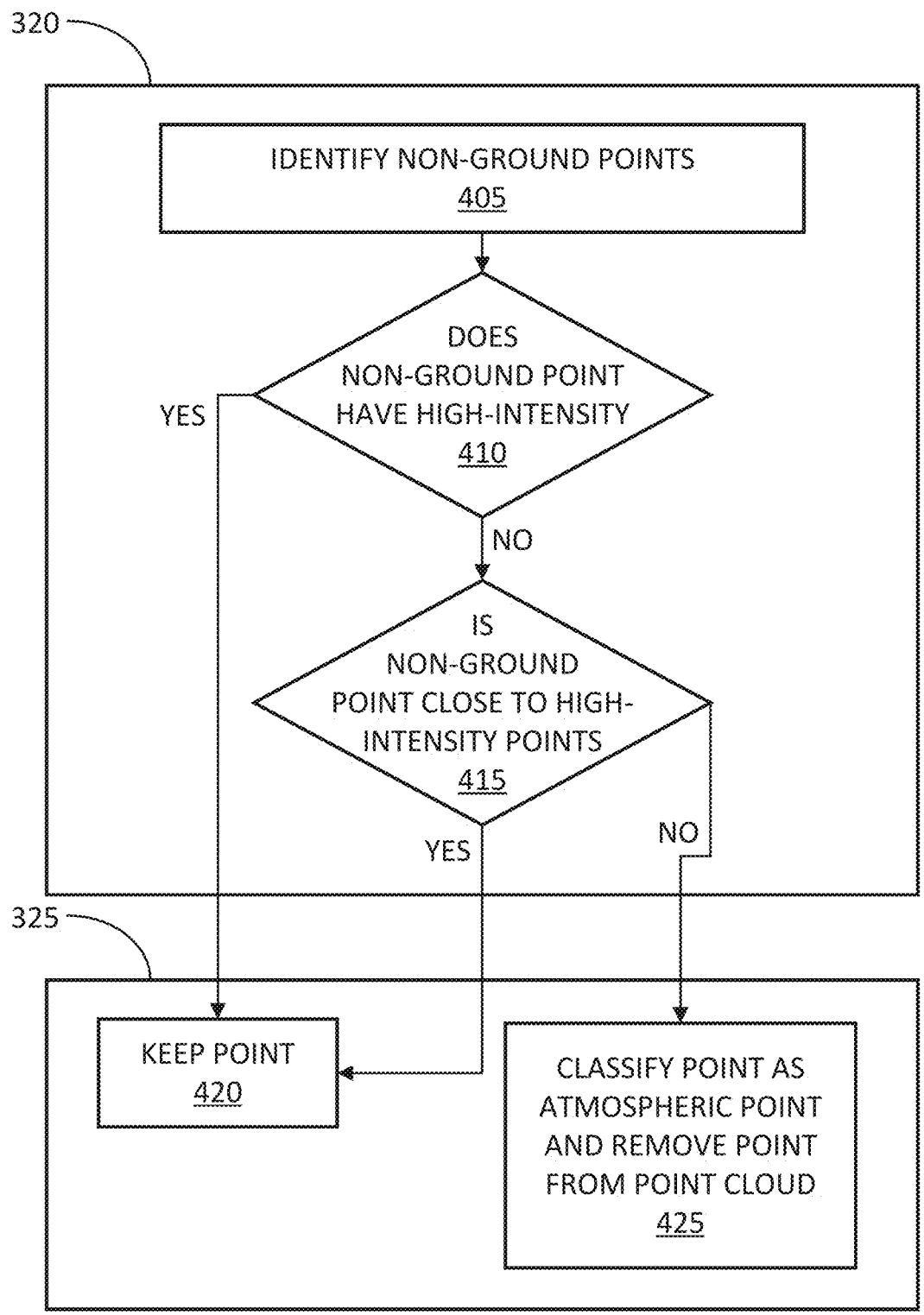
FIG. 4 is an example flowchart of a method for filtering points in a LiDAR point cloud, according to various embodiments of the present disclosure.

FIG. 4 is an example flowchart of a method for identifying and isolating atmospheric condition points (step 320) and filtering the atmospheric condition points (step 325) in a LiDAR initial processed point cloud, according to various embodiments of the present disclosure.

At 405, non-ground points are identified from the initial processed point cloud. At 410, it is determined whether each of the non-ground points has high-intensity. According to various embodiments, to determine whether a non-ground point has high intensity, the non-ground point may be given a density score based on the LiDAR data for that point in the point cloud. For each non-ground point, if the intensity score is greater than a predetermined intensity threshold score, the non-ground point is classified as a high-intensity point. For each non-ground point, if the intensity score is less than the predetermined intensity threshold score, the non-ground point is classified as a low-intensity point. Each non-ground point classified as having high intensity (a high-intensity point) is, at 420, kept in the point cloud.

For each non-ground point classified as having low intensity (a low-intensity point), a position of the low-intensity point is determined, as well as a mean distance of the low-intensity point from nearby high-intensity points. At 415, it is determined whether each of the non-ground, low-intensity points is close to the high-intensity points. A low-intensity point is considered close to the high-intensity points when the mean distance of the low-intensity point to the nearest number of high-intensity points is less than a threshold distance. Otherwise, the low-intensity point is not considered close to the high-intensity points. According to various embodiments, the threshold distance may be a distance selected from approximately 10 cm to 3 m in length. It is noted, however, that other suitable threshold distances may be used, while maintaining the spirit and functionality of the present disclosure. According to various embodiments, as the threshold distance is selectively changed, the number of near high intensity points that are used to calculate the threshold distance may also increase. In other embodiments, an initial distance measure may be used to only look for points in a designated cloud around the low intensity point being considered. This may limit the number of high intensity points for which the distance must be calculated between the low intensity point and the high intensity points.

If the low-intensity point is determined to be close to the high-intensity points, the low-intensity point is, at 420, kept in the point cloud. If the low-intensity point is determined not to be close to the high-intensity points, the low-intensity point is, at 425, classified as an atmospheric point and removed from the point cloud.

According to some embodiments, setting the intensity threshold and the threshold distance may be dynamic, based upon the sensed conditions in the environment. For example, for intensities that are close to the intensity threshold, the threshold distance may be set to higher values in instances where the intensity scores for points are more uniformly high. Conversely, when intensity scores are otherwise low within a scan, an intensity score near the intensity threshold may have a lower threshold distance such that more points may be captured as part of obstacles 150.

Figure 5:
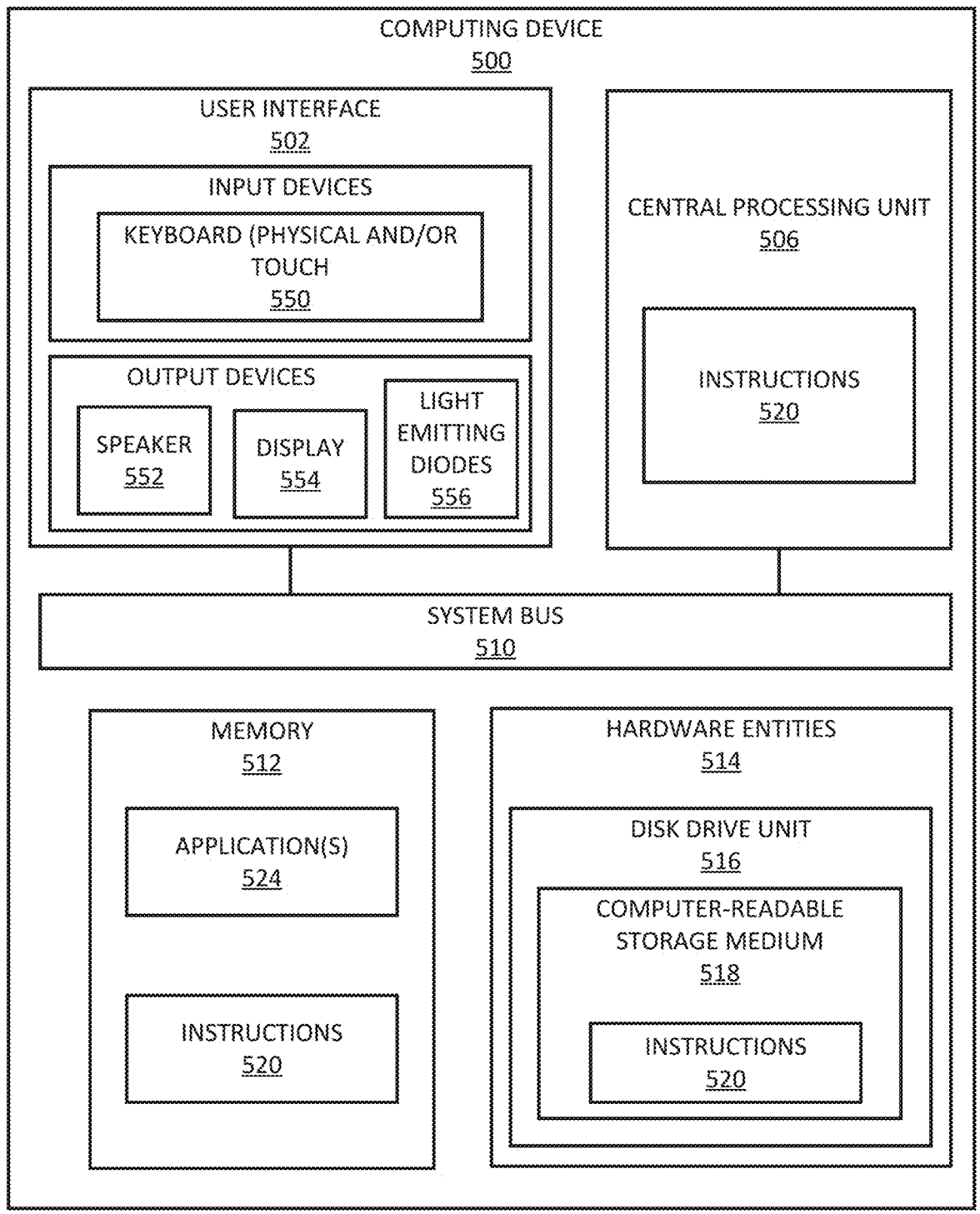
FIG. 5 illustrates example elements of a computing device, according to various embodiments of the present disclosure.

Referring now to FIG. 5, an illustration of an example architecture for a computing device 500 is provided. The computing device 130 of FIG. 1 may be the same as or similar to computing device 500. As such, the discussion of computing device 500 is sufficient for understanding the computing device 130 of FIG. 1, for example.

Computing device 500 may include more or less components than those shown in FIG. 1. The hardware architecture of FIG. 5 represents one example implementation of a representative computing device configured to one or more methods and means for filtering atmospheric conditions from LiDAR point clouds, as described herein. As such, the computing device 500 of FIG. 5 implements at least a portion of the method(s) described herein (for example, method 300 of FIG. 3 and/or method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a disk drive unit 516 comprising a computer-readable storage medium 518 on which is stored one or more sets of instructions 520 (e.g., programming instructions such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

Figure 6:
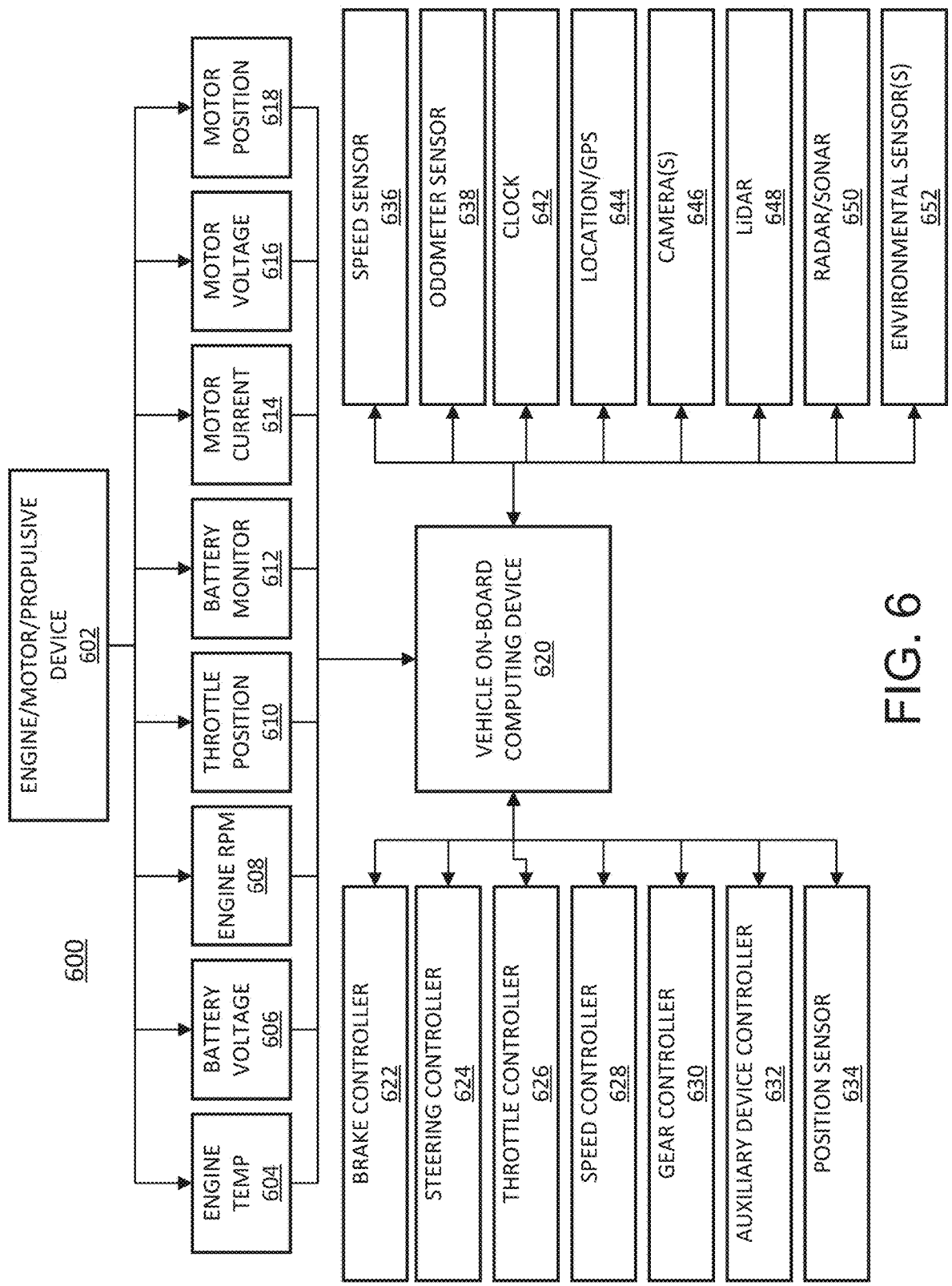
FIG. 6 illustrates example architecture of a vehicle, according to various embodiments of the present disclosure.

Referring now to FIG. 6, example vehicle system architecture 600 for a vehicle is provided, in accordance with various embodiments of the present disclosure.

Vehicle 105 of FIG. 1 can have the same or similar system architecture as that shown in FIG. 6. Thus, the following discussion of vehicle system architecture 600 is sufficient for understanding vehicle 105 FIG. 1.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example: a position sensor 634 such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620, it may be a separate device, or multiple clocks may be available.

The vehicle system architecture 600 also may include various sensors that operate to gather information about the environment in which the vehicle is traveling. These sensors may include, for example: a location sensor 644 (for example, a Global Positioning System (GPS) device); object detection sensors such as one or more cameras 646; a LiDAR sensor system 648; and/or a radar and/or a sonar system 650. The sensors also may include environmental sensors 652 such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an on-board computing device 620. The on-board computing device 620 may be configured to analyze the data captured by the sensors and/or data received from data providers, and may be configured to optionally control operations of the vehicle system architecture 600 based on results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the on-board computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 is communicated from those sensors to the on-board computing device 620. The object detection information and/or captured images are processed by the on-board computing device 620 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of filtering atmospheric conditions from Light Detection and Ranging (LiDAR) point clouds, comprising:
generating, using a LiDAR system, at least one point cloud, wherein the LiDAR system includes a processor; and
using the processor:
identifying and isolating one or more ground points within a point cloud of the at least one point cloud, wherein the one or more ground points indicate a ground portion within an environment of the point cloud;
filtering out the ground portion from the point cloud, generating an initial processed point cloud;
identifying and isolating one or more atmospheric condition points within the initial processed point cloud, wherein the one or more atmospheric condition points indicate one or more atmospheric conditions within an environment of the initial processed point cloud,
wherein the identifying and isolating the one or more atmospheric condition points comprises:
identifying one or more high-intensity points and one or more low-intensity points, and a position for each of the one or more high-intensity point and each of the one or more low-intensity points, within the initial processed point cloud;
for each of the one or more low-intensity points, determining a mean distance of the low-intensity point to one or more of the one or more high-intensity points; and
for each of the one or more low-intensity points, when the mean distance is greater than a threshold distance, classifying the low-intensity point as an atmospheric condition point; and
filtering out the atmospheric condition points from the initial processed point cloud, generating a final processed point cloud.

2. The method of claim 1, wherein the identifying the one or more high-intensity points and the one or more low-intensity points within the initial processed point cloud comprises:
determining an intensity score for each point in the initial processed point cloud;
classifying each point in the initial processed point cloud having an intensity score above an intensity threshold as a high-intensity point; and
classifying each point in the initial processed point cloud having an intensity score below the intensity threshold a low-intensity point.

3. The method of claim 1, further comprising classifying all points not filtered out in the final processed point cloud as obstacle points, wherein the obstacle points indicate one or more objects within the environment of the final processed point cloud.

4. The method of claim 1, wherein the one or more atmospheric conditions comprise rain or fog.

5. The method of claim 1, wherein:
the at least one point cloud includes an initial point cloud and a subsequent point cloud; and
the identifying and isolating the one or more ground points comprises:
identifying and isolating one or more ground points within the initial point cloud; and
identifying and isolating one or more ground points within the subsequent point cloud by comparing the one or more ground points within the initial point cloud against one or more points within the subsequent point cloud.

6. The method of claim 1, wherein the identifying and isolating the one or more ground points comprises comparing the point cloud against one or more secondary scans of the environment of the point cloud.

7. The method of claim 6, wherein the one or more secondary scans include one or more of: one or more 2-dimensional camera images of the environment; and one or more radio detection and ranging (RADAR) scans of the environment.

8. A system for filtering atmospheric conditions from Light Detection and Ranging (LiDAR) point clouds, comprising:
a vehicle; and
a LiDAR system, coupled to the vehicle, the LiDAR system comprising:
one or more LiDAR sensors; and
a processor, configured to:
generate at least one point cloud of an environment;
identify and isolate one or more ground points within a point cloud of the at least one point cloud, wherein the one or more ground points indicate a ground portion within an environment of the point cloud;
filter out the ground portion from the point cloud, generating an initial processed point cloud;
identify and isolate one or more atmospheric condition points within the initial processed point cloud, wherein the one or more atmospheric condition points indicate one or more atmospheric conditions within an environment of the initial processed point cloud,
wherein the identifying and isolating the one or more atmospheric condition points comprises:
identifying one or more high-intensity points and one or more low-intensity points, and a position for each of the one or more high-intensity point and each of the one or more low-intensity points, within the initial processed point cloud;
for each of the one or more low-intensity points, determining a mean distance of the low-intensity point to one or more of the one or more high-intensity points; and
for each of the one or more low-intensity points, when the mean distance is greater than a threshold distance, classifying the low-intensity point as an atmospheric condition point; and
filter out the atmospheric condition points from the initial processed point cloud, generating a final processed point cloud.

9. The system of claim 8, wherein the identifying the one or more high-intensity points and the one or more low-intensity points within the initial processed point cloud comprises:
determining an intensity score for each point in the initial processed point cloud;
classifying each point in the initial processed point cloud having an intensity score above an intensity threshold as a high-intensity point; and
classifying each point in the initial processed point cloud having an intensity score below the intensity threshold a low-intensity point.

10. The system of claim 8, wherein the processor is further configured to classify all points not filtered out in the final processed point cloud as obstacle points, wherein the obstacle points indicate one or more objects within the environment of the final processed point cloud.

11. The system of claim 8, wherein:
the at least one point cloud includes an initial point cloud and a subsequent point cloud; and
the identifying and isolating the one or more ground points comprises:
identifying and isolating one or more ground points within the initial point cloud; and
identifying and isolating one or more ground points within the subsequent point cloud by comparing the one or more ground points within the initial point cloud against one or more points within the subsequent point cloud.

12. The system of claim 8, further comprising one or more secondary scanners configured to:
scan the environment of the point cloud; and
generate one or more secondary scans of the environment of the point cloud,
wherein the identifying and isolating the one or more ground points comprises comparing the point cloud against the one or more secondary scans of the environment of the point cloud.

13. The system of claim 12, wherein the one or more secondary scanners include one or more of: one or more cameras; and one or more radio detection and ranging (RADAR) scanners.

14. A system, comprising:
at least one Light Detection and Ranging (LiDAR) system, coupled to a vehicle, configured to generate one or more point clouds of an environment; and
a computing device, including a processor and a memory, coupled to the vehicle, configured to store programming instructions that, when executed by the processor, cause the processor to:
identify and isolate one or more ground points within a point cloud of the one or more point clouds, wherein the one or more ground points indicate a ground portion within an environment of the point cloud;
filter out the ground portion from the point cloud, generating an initial processed point cloud;
identify and isolate one or more atmospheric condition points within the initial processed point cloud, wherein the one or more atmospheric condition points indicate one or more atmospheric conditions within an environment of the initial processed point cloud,
wherein the identifying and isolating the one or more atmospheric condition points comprises:
identifying one or more high-intensity points and one or more low-intensity points, and a position for each of the one or more high-intensity point and each of the one or more low-intensity points, within the initial processed point cloud;
for each of the one or more low-intensity points, determining a mean distance of the low-intensity point to one or more of the one or more high-intensity points; and
for each of the one or more low-intensity points, when the mean distance is greater than a threshold distance, classifying the low-intensity point as an atmospheric condition point; and
filter out the atmospheric condition points from the initial processed point cloud, generating a final processed point cloud.

15. The system of claim 14, wherein, when the processor identifies the one or more high-intensity points and the one or more low-intensity points within the initial processed point cloud, the programming instructions are further configured to cause the processor to:
determine an intensity score for each point in the initial processed point cloud;
classify each point in the initial processed point cloud having an intensity score above an intensity threshold as a high-intensity point; and
classify each point in the initial processed point cloud having an intensity score below the intensity threshold a low-intensity point.

16. The system of claim 14, wherein the programming instructions are further configured to cause the processor to classify all points not filtered out in the final processed point cloud as obstacle points, wherein the obstacle points indicate one or more objects within the environment of the final processed point cloud.

17. The system of claim 14, wherein:
the one or more point clouds include an initial point cloud and a subsequent point cloud; and
when the processor identifies and isolates the one or more ground points, the programming instructions are further configured to cause the processor to:
identify and isolate one or more ground points within the initial point cloud; and identify and isolate one or more ground points within the subsequent point cloud by comparing the one or more ground points within the initial point cloud against one or more points within the subsequent point cloud.

\* \* \* \* \*